Figure 1:
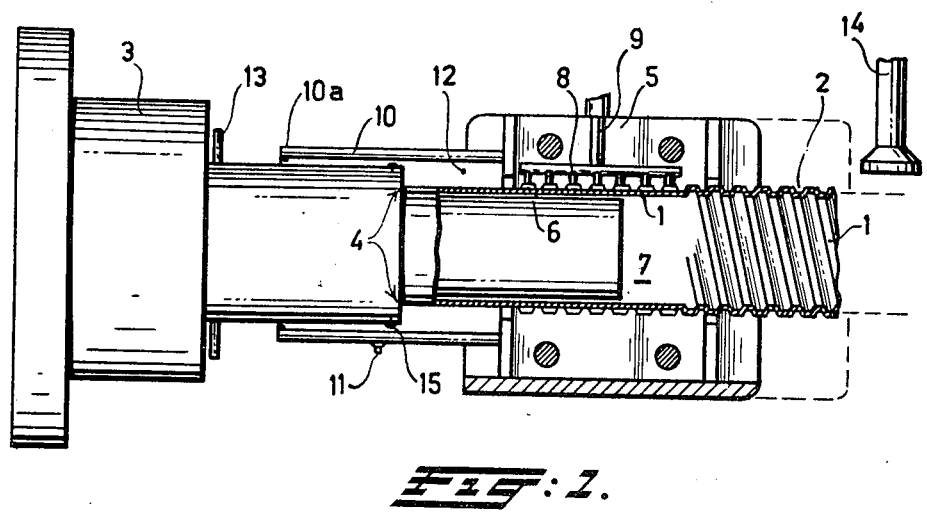

United States Patent

Van Zon

[11] 3,959,427
[45] May 25, 1976

[54] METHOD FOR MANUFACTURING A PLASTIC TUBE

[75] Inventor: Cornelis Van Zon, Zwolle, Netherlands

[73] Assignee: Industriele Onderneming Wavin N.V., Zwolle, Netherlands

[22] Filed: Oct. 20, 1972

[21] Appl. No.: 299,240

Related U.S. Application Data

[62] Division of Ser. No. 869,206, Oct. 24, 1969, Pat. No. 3,711,232.

[30] Foreign Application Priority Data

Oct. 30, 1968  Netherlands .................. 6815449
Apr. 24, 1969  Netherlands .................. 6906380

[52] U.S. Cl. ............................ 264/99; 264/98; 264/DIG. 52
[51] Int. Cl.² ................................ B29C 17/07
[58] Field of Search ........... 264/101, 98, 99, 167, 264/DIG. 52, 314; 425/326, 150, 349, 393

[56] References Cited
UNITED STATES PATENTS

| | | | |
|---|---|---|---|
| 1,879,663 | 9/1932 | Dreyer | 264/DIG. 52 |
| 2,306,018 | 12/1942 | Fentress | 264/DIG. 52 |
| 2,405,245 | 8/1946 | Ushakoff | 264/314 |
| 2,779,976 | 2/1957 | Roberts et al. | 264/275 |
| 2,837,121 | 6/1958 | Roberts | 264/101 |
| 2,967,563 | 1/1961 | Huff et al. | 264/275 |
| 3,184,793 | 5/1965 | Pluorde | 264/DIG. 52 |
| 3,243,850 | 4/1966 | Zieg | 264/DIG. 52 |
| 3,584,093 | 6/1971 | Vernon | 264/101 |
| 3,692,889 | 9/1972 | Hetrich | 264/167 |
| 3,705,779 | 12/1972 | Zon | 264/167 |
| 3,793,423 | 2/1974 | O'Brian | 264/103 |

FOREIGN PATENTS OR APPLICATIONS

210,675  1/1967  Sweden .................. 264/DIG. 52

*Primary Examiner*—Jay H. Woo
*Attorney, Agent, or Firm*—Irving M. Weiner; Pamela S. Burt

[57] ABSTRACT

A device for manufacturing a plastic tube with transverse or helical grooves consisting of an extruder, two movable halves of die with an inner ribbed profile and being capable of forming a hollow mould, said halves of die each provided with circular elongations for heating the region between the opening of the extruder and the beginning of the mould, an inflatable member in the tube for conforming the tube to the profile of the mould. The inflatable member comprises a movable cylinder having two expandable end discs, an inlet and an outlet for compressed medium being situated between the two end discs, the valve closing said outlet being loaded by a spring such that only pressure medium will escape after the end discs have formed a closed space with the inner side of the tube.

2 Claims, 5 Drawing Figures

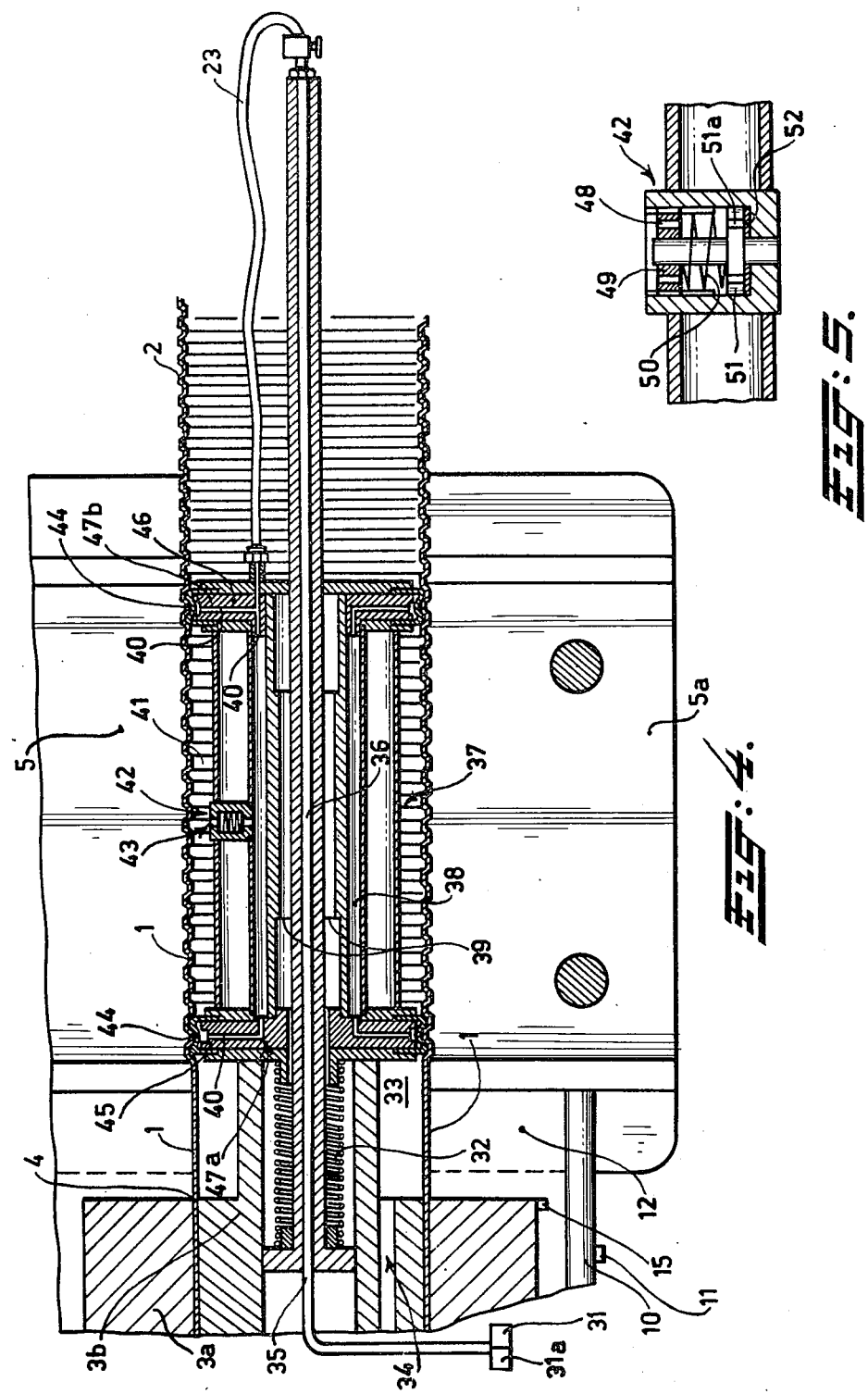

METHOD FOR MANUFACTURING A PLASTIC TUBE

This is a division of application Ser. No. 869,206, filed Oct. 24, 1969, and issued as U.S. Pat. No. 3,711,232 on Jan. 16, 1973.

The invention relates to a device for manufacturing a plastic tube with transverse grooves consisting at least of an extruder with an annular mouth and two halves of die each die half of which has a semi-tubular mould cavity with a ribbed profile, the halves of die being movable along paths in such a way that over a part of their paths the opposite halves of die, provided if desired with cooling means, complete one the other by their mould cavities so as to constitute a hollow mould, means being provided for generating an over pressure with respect to the outside in this plastic tube when it is in the mould in order to press the plastic into the ribbed profile. The expression transverse grooves comprises also helical grooves.

Such devices wherein two rows of halves of die are movable along endless guide paths are known in itself. These devices are, however, exclusively suitable for manufacturing flexible plastic tube with transverse grooves of small diameter. As soon as plastic tubes with transverse grooves of larger diameter like 500 mm and the like should be manufactured these devices become so large that they occupy too much space, or the costs for the construction of such machines are not justified from the point of view of production.

Since there is much interest for plastic tubes with transverse grooves of large diameter which are combined with thinwalled plastic inner tubes which are smooth on their inner side, whereby for such tubes of large diameter it is possible to economize considerably on material it has often been tried to provide a simple device which has not the aforementioned drawbacks.

It is an object of the invention to provide a simple method and device in which the aforementioned difficulties have been obviated.

This object is attained according to the invention in the way that the device consists of two halves of die, heating means for supplying heat to the region situated between the annular mouth piece and the two halves of die in their extreme active position, the driving means for the rate of moulding of the plastic tube by the extruder, the means for separating the two halves of die, means for returning the two halves of die to the start of their operative position, and the delimiting member which limits the return point of the halves of die, being related to each other in such a way that, when the active phase commences, at least the last transverse groove formed in the plastic tube or the region of the plastic tube besides said transverse groove cooperates with the last rib profile situated on the halves of die at the end opposite the extruder mouth piece.

Such a device is advantageous in that only two halves of die can be used whereby the construction of the required device is considerably simplified and as a consequence the cost of production can be considerably reduced. Moreover tubes of a different diameter can be more easily manufactured by faster interchanging the halves of die. Due to the application of two halves of die the part of the plastic tube between the end of the halves of die which is situated on the side of the annular mouth piece and the annular mouth piece itself would cool down on moving the halves of die in their active phase, owing to which the desired information by means of an external vacuum or an over pressure within the plastic tube is no longer possible. This trouble is now overcome by applying said heating being preferably an elongated heatable part of the half of die whereby the part of the plastic tube situated between the simular mouth piece and the end of the cooperating halves of die are held in a plastic condition by means of the heatable semi circular parts.

In order to ensure that in the plastic tube regularly formed transverse grooves are produced the driving means for the rate of extrusion of the tube by the extruder, means for separating from each other the two halves of die at the end of their operative position, the means for returning the halves of die, after the formation of the transverse grooves, to the start of their operative position and the delimiting member, delimiting the return of the halves of die, are related to each other in such a way that on starting the operative phase at least the last groove formed on the plastic tube can cooperate with the last rib profile situated on the halves of die at the end opposite the mouth piece of the extruder.

Figure 2:
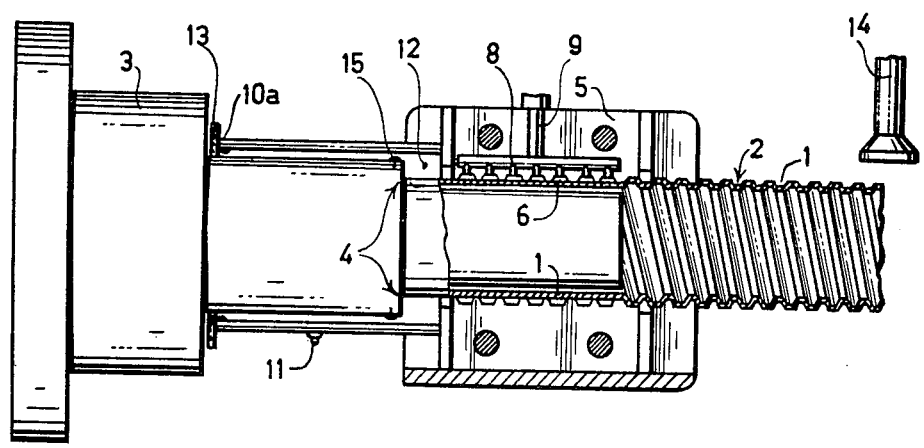
Figure 3:
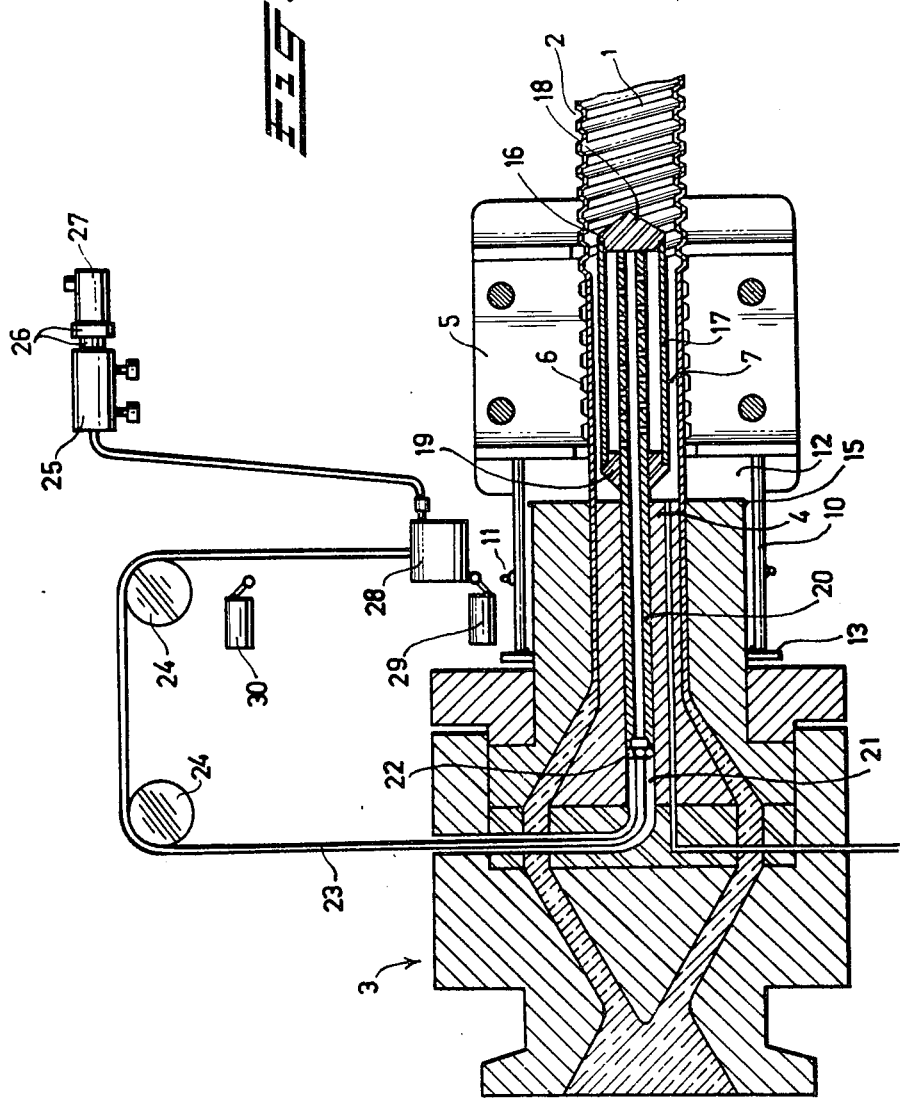

The invention will now be clarified with reference to the drawing in which an embodiment of the device according to the invention is represented:

FIG. 1 shows a section of a vacuum device according to the invention in the operative position with a part of a moulded plastic tube;

FIG. 2 a like device according to FIG. 1 in the beginning of the operative position, and FIG. 3 a device for providing transverse grooves in the plastic tube by applying an inflatable member instead of applying vacuum;

FIG. 4a device according to FIG. 3 with a preferred member for applying pressure to the plastic tube from the inner side;

FIG. 5 a detail of the member used in a device according to FIG. 4.

Represented in FIGS. 1 and 2 is a device for manufacturing a flexible plastic tube 1 with transverse grooves 2 by creating an external vacuum. The device consists of a partially represented extruder 3 with an annular mouth piece 4 and two halves of die 5. Each half 5 is semi-tubular and provided with a ribbed helical profile 6. The two halves of die 5 are movable in a longitudinal direction in guides (not shown) and can be driven by drive rollers. The opposite halves of die 5 complete one the other in their operative position so as to form a hollow mould 7 by their mould cavities. The halves of die 5 are provided with suction channels 8 which can be connected to a vacuum system via the duct 9.

According to the invention each half of die 5 is elongated by a semi-circular part 10 heatable via connecting terminals 11. This semi-circular part 10 is so long that in the extreme operative position of the halves of die, as represented in FIG. 1 in dotted lines, the annular mouth piece 4 of the extruder 3 is situated within the tubular part 12 which is formed when the heatable semi-circular parts 10 cooperate with each other. In this way the tube remains in such a plasticized condition that same can be deformed by pressure, e.g. 120° for a pvc material.

The position of return of the halves of die 5 is limited by the end 10a of the elongated parts 10 which abuts against a delimiting member in the shape of a plate 13. This plate is situated in such a way that in case of an adapted rate of formation of plastic tube by the extruder 3 and at the velocity by which the two halves of die 5 by means of a chain and gear wheel are returned to the start of the operative position the last rib profile 6 engages the last transverse groove part 2a already formed. A nozzle 14 ensures the cooling of the tube. A switch 15 operated by the end 10a of the elongated part 10 determines the time at which the halves of die move apart and their return to the initial position.

The device operates as follows. By means of extruder 3 a plastic tube 1 is extruded from the annular mouth piece 4. Now the two halves of die 5 are disposed on this plastic tube, whereby due to a created vacuum via the suction channels 8 the tube 1 is sucked and due to the rib profiles 6 transverse grooves 2 form in the plastic tube 1.

After reaching their extreme position the switch 15 is excited and the two halves of die 5 move apart and are returned into their initial position. Thereupon the halves of die 5 move again toward one the other and the rib profile 6a is applied to the last transverse groove 2a which is formed in the plastic tube.

During the movement of the dies in their operative position whereby the transverse grooves are provided in the tube part of the plastic tube 1, situated between the mouth piece 4 of the extruder and the semi circular parts 10 of the halves of die remains sufficiently heated, due to the heatable semi-circular part obtained by the cooperation of the semi-circular parts 10, to allow its deformation by the vacuum when it is in the halves of die.

According to FIG. 3 an inflatable member is used for the deformation of the tube. Identical parts are denoted by identical reference numerals.

Instead of suction channels 8 the device is now provided with a movable member 16 with elastical inflatable wall 17. This wall 17 is secured on two fastening plates 18 and 19 which are on a stiff hollow rod 20 which is movable in a bore 21 of the extruder head. The end 22 of the rod 20 is connected with a flexible hose 23 running over two rollers 24 to a three way valve 25 connected to a compressed air container 26 and a vacuum pump 27. The hose 23 is provided with a weight 28 which can operate with a switch 29 or 30. The switch 30 connects the three way valve 25 to the vacuum pump 27, while the switch 29 connects the three way valve to the container 26 of compressed air. Due to the dead weight of the weight 28 the member 9 is again returned to its initial position. In this position the wall 17 will be inflated by means of switch 29 and container 26 of compressed air and the plastic tube will be pressed into the profiled part of the halves of die 5. During the movement of the halves of die the member 16 is taken along but in the final position the weight 28 operates the switch 30, whereby the vacuum pump 27 sucks off the medium in the member 16. Due to the weight 28 the rod 20 with member 16 is returned to the starting position whereupon the switch 29 is again excited.

Obviously it is also possible to provide a stopper in the plastic tube which is stationary with respect to the extruder and to supply the compressed air directly via the bore 21. If desired the wall 17 may be provided with protruding parts fitting in recesses provided in the protruding profiled portions 6 whereby simultaneously with the inflation apertures are formed in the plastic tube.

As to the displacement of the halves of die various displacement means are usable. So for instance the halves of die may be guided according to rectangular paths with rounded passages and the displacement may be effected by rollers which can be driven in two directions. It is also possible to displace the halves of die, by means of a chain and gear wheels (not shown).

The device represented in FIG. 4 comprises a partially represented extruder 3 consisting of a core 3a and a casing 3b, with an annular mouth piece 4 and two halves of die 5 and 5a. Numerals corresponding to numerals in FIGS. 1 – 3 have the same meaning.

For the formation of the grooves 2 in the plastic tube 1 the device is provided with a tube inflating member 37 movable in the operative track of the hollow mould (formed by dies 5, 5a) on a supporting rod 36 connected with the core 3a, the inflator comprising two spaced expandable closing discs 47a and 47b and at least one outlet 43 for the medium, situated between the closing discs 47a, 47b. This outlet 43 for the medium is disposed on a cylinder 38 which via a hose 23 communicates with the bore 21 which goes through. The cylinder 38 carries at its end the closing discs 47a, 47b. Provided in the outlet 43 for the medium are adjustable pressure regulating means 42 in such a way that compressed medium, supplied via a bore 35 running through the core 3a and the hose 23, cannot directly flow off via the oulet 43 for the medium before the closing discs 47a, 47b cooperate with the tube 1 and a closed space 41 is formed which is bounded by the two expandable closing discs 47a, 47b. For the expansion of the closing discs 47a, 47b the latter consist of plates 46 with bores 40 and rubber sealings 44 secured on these plates at the outer side thereof. Via the bore 40 a compressed medium from the hose 23 can inflate the rubber sealing.

The pressure regulating means 42 consist of a shutt off valve 51 loaded by a spring 50 and cooperating with a seat 52. Provided in the valve 51 are apertures 51a in order to allow compressed medium to pass when the shut off valve is removed from the seat, the compressed medium being capable of flowing from the outlet for the medium via the apertures 48 in the plate 49 which retains the spring. The inflator 37 is secured by bearings 39 on the rod 36. The spaces provided between the bearings 39 ensure that on moving the inflator 37 the space 33 formed which is bounded by the tube 1, core 3a and closing disc 47a communicates with the surroundings. If desired a second bore 34 may be provided in the core 4 which on the one hand opens on the outerside of the device and on the other side in the core within the annular mouth piece 4.

The device is further provided with means for limiting the displacement of the movable inflator 37, which e.g. consist of a micro switch 15 which is connected with a source of compressed medium, e.g. a compressor 31a. This micro switch can e.g. operate also a vacuum pump 31.

The displaceable inflator 37 is further connected with means for moving this member from its final position to a starting position, this means being in the shape of a spring 32 situated in the core 3a. It is obvious that instead of a spring also other means can be used in order to return the inflator 37 to its original position. So for instance an inflator 37 which under the influence of a falling weight can be returned to its initial position can be used.

The device operates as follows.

A plastic tube 1 is extruded of an extruder 3, this tube 1 is guided in the hollow mould formed by two halves of dies 5, 5a which are complementary to one the other. After the plastic tube is guided in this hollow mould compressed medium e.g. compressed air is supplied to the cylinder 38 by the compressor 31a via bore 36 and hose 23. Due to the suitable adjustment of the pressure regulating means 42 that is to say by the aid of the pressure of the spring 50 on the shut off valve 51, provided with widths of passage 52, which is pressed against the seat 52, at first the compressed medium is via the bores 40 supplied to the sealings 44 of the closing discs 47a, 47b. After these closing discs 47a, 47b almost completely cooperate with the plastic tube 1 and this plastic tube 1 cooperates with the halves of die 5, 5a the pressure in the cylinder 16 increases in such a way that compressed medium can escape via the shut off valve 51 into the space 41 bounded by plastic tube 1, the closing discs 47a, 47b and the cylinder 41. Under the influence of the prevailing pressure the plastic tube 1 is pressed into the ribbed profiles of the halves of die 5. During this inflation the movable inflator 37 travels along with the likewise moving halves of die 5, 5a until the micro switch 15 contacts the protruding portion of the semi circular part 10. At that moment the micro switch 15 operates the compressor 31a whereby the latter is switched off and the bore 36 and the hose 17 and the cylinder 16 are connected to a suction member viz. the vacuum pump 31. The compressed medium is removed from the cylinder 38 and the expandable sealings 44 return to their starting position so that the closing discs 47a, 47b clear the plastic tube 1. Due to the action of the spring 32 the inflator is again returned to its starting position, whereby it is arranged for that the closing disc 47b on expanding cooperates again with the transversely grooved part of the plastic tube. Simultaneously the micro switch also moves apart the halves of die 5, 5a and the latter return again to their starting position.

Since during to the displacement of the inflator 37 too high a pressure could be produced in the space 33 between tube 1, annular mouth piece of extruder 3 and closing disc 47a on account of leakage of e.g. air between the closing disc 47a and the tube 1 a second bore 34 running through the core is provided which opens at one end in the portion of the core between the annular mouth piece and the supporting rod 36 and at the other end on the outer side of the device, whereby the compressed medium escaping via the closing disc 47a can flow outwards and no undesired deformation of the plastic can be produced between the closing disc 47a and the annular mouth piece of the extruder 3. When the free end of semi circular part 10 contacts the plate 13 air is fed via the bore 35 and 36 by the compressor 31a.

It should be noted that it is also possible to apply closing discs 47a and 47b which are provided between two plates, one of the plates being movable and as consequence being pressed by mechanical or medium pressure against the other when the closing disc expands.

The heating means or semi circular parts are heated to temperatures providing sufficient plasticity to the tube in order to deform the tube by vacuum or pressure. A temperature of 120°C – 160°C is used for polyvinylchloride.

Having thus described the invention and manner of its operation what I claim as my invention is:

1. A method of continuously manufacturing an open ended, externally deformed, thermoplastics tubular member by means of a tube extruder having an annular outlet and two die halves movable through an advance stroke along parallel paths whilst cooperating to form a hollow, internally transversely ribbed, die cavity, in which method the die halves are moved along such parallel paths with a portion of the tube extruded through said annular outlet extending within the die cavity, the interior of the tube being closed at two positions, by expandable discs and the pressure of a pressure medium of more than 1 atmosphere between said two positions within the tube being directly applied to the tube wall to press the tube wall against the interior of the die cavity until the outer side of the tube has been deformed during said advance stroke, after which said pressure is relieved and the die halves are moved apart from one another and returned to their starting position; and in which method the inner side of the tube portion extruded from said annular outlet during the advance movement of the die halves and situated between the annular outlet of the extruder and the first expansible disc as seen from the extruder in the conveying direction of the tube is connected with the exterior at least during the deformation of a tube part and the tube remains in a heated condition for subsequent deformation by the ribbed interior of die cavity formed by the mold halves.

2. A method as claimed in claim 1, in which said tube portion extruded during said advance movement is maintained in a deformable condition by heating means surrounding said tube portion.

* * * * *